United States Patent [19]

Lewis et al.

[11] 4,424,521

[45] Jan. 3, 1984

[54] INK JET APPARATUS AND RESERVOIR

[75] Inventors: Arthur M. Lewis, Ridgefield, Conn.; Morris W. Leen, Yorktown Heights, N.Y.

[73] Assignee: Exxon Research and Engineering Co., Florham Park, N.J.

[21] Appl. No.: 336,602

[22] Filed: Jan. 4, 1982

[51] Int. Cl.³ .............................................. G01D 15/18
[52] U.S. Cl. ................................................ 346/140 R
[58] Field of Search .................................... 346/140 R

[56] References Cited

U.S. PATENT DOCUMENTS

| | | | |
|---|---|---|---|
| 4,072,959 | 2/1978 | Elmquist | 346/140 R |
| 4,216,477 | 8/1980 | Matsuda | 346/140 R |
| 4,312,010 | 1/1982 | Doring | 346/140 R |
| 4,367,478 | 1/1983 | Larsson | 346/140 R |

*Primary Examiner*—Joseph W. Hartary
*Attorney, Agent, or Firm*—Norman L. Norris

[57] ABSTRACT

An ink jet array comprises a plurality of ink jet chambers having inlets coupled to a reservoir. In order to promote priming, the reservoir is concave with the inlets to the chamber coupled into the reservoir in an area of reduced cross-sectional area.

16 Claims, 10 Drawing Figures

INK JET APPARATUS AND RESERVOIR

BACKGROUND OF THE INVENTION

This invention relates to apparatus wherein droplets of ink are ejected from an orifice of an ink jet, and more particularly, to a reservoir for supplying ink to such an ink jet.

The typical ink jet is supplied with ink from a reservoir. Such a reservoir must be properly primed with ink before ink jet printing may proceed, i.e., droplets of ink are ejected on a properly controlled basis for displaying information.

Priming is typically achieved by forcing ink into the reservoir under high pressure and/or at high flow rates. Priming in this manner may produce flow patterns which are difficult to predict or control with the resulting formation of bubbles which can adversely affect the operation of an ink jet. Once a bubble has formed and attached itself to the wall of the device either in the reservoir or elsewhere within the apparatus, it may be very difficult to dislodge. Even where the flow rates during priming are relatively low, bubbles can be formed by a meniscus crossing a cavity with a relatively small radius. Thus a passageway having a rectangular cross-section may generate bubbles. Additional instabilities which tend to generate bubbles arise when liquid fills a converging corner.

It is common to utilize a single reservoir with a plurality of jets. Typically, an inlet restrictor of some type couples the reservoir to each of a plurality of jets. Although the flow of communication between the reservoir and the jets is minimized through the use of the inlet restrictor, it is, nevertheless, possible to have a fair degree of undesirable cross-talk between one jet and another.

SUMMARY OF THE INVENTION

It is one object of this invention to provide an ink jet apparatus having an ink reservoir which facilitates priming.

It is a more specific object of this invention to provide an ink jet apparatus having an ink reservoir which minimizes the possibility of forming bubbles.

It is another object of this invention to provide an ink jet apparatus wherein cross-talk through the reservoir for ink supplying a plurality of jets is minimized.

In accordance with these and other objects, a preferred embodiment of the invention comprises an ink jet apparatus including at least one ink jet chamber having an ink jet ejection orifice and an inlet and a relatively shallow reservoir including wall portions at the outer extremities of the reservoir tapering to an acute angle. The inlet of the ink jet communicates with the reservoir in the region of the acute angle so as to use the surface tension and wetting properties of the ink to facilitate priming.

In the preferred embodiment of the invention, at least one of the walls of the reservoir is inwardly concave. The cavity is characterized by a radius of curvature substantially larger than the maximum depth of the reservoir. Preferably, the acute angle at the inlet restrictor is less than 30°. The reservoir may be supplied with a single supply opening or may include a vent opening.

DETAILED DESCRIPTION OF PREFERRED EMBODIMENTS

Figure 1:
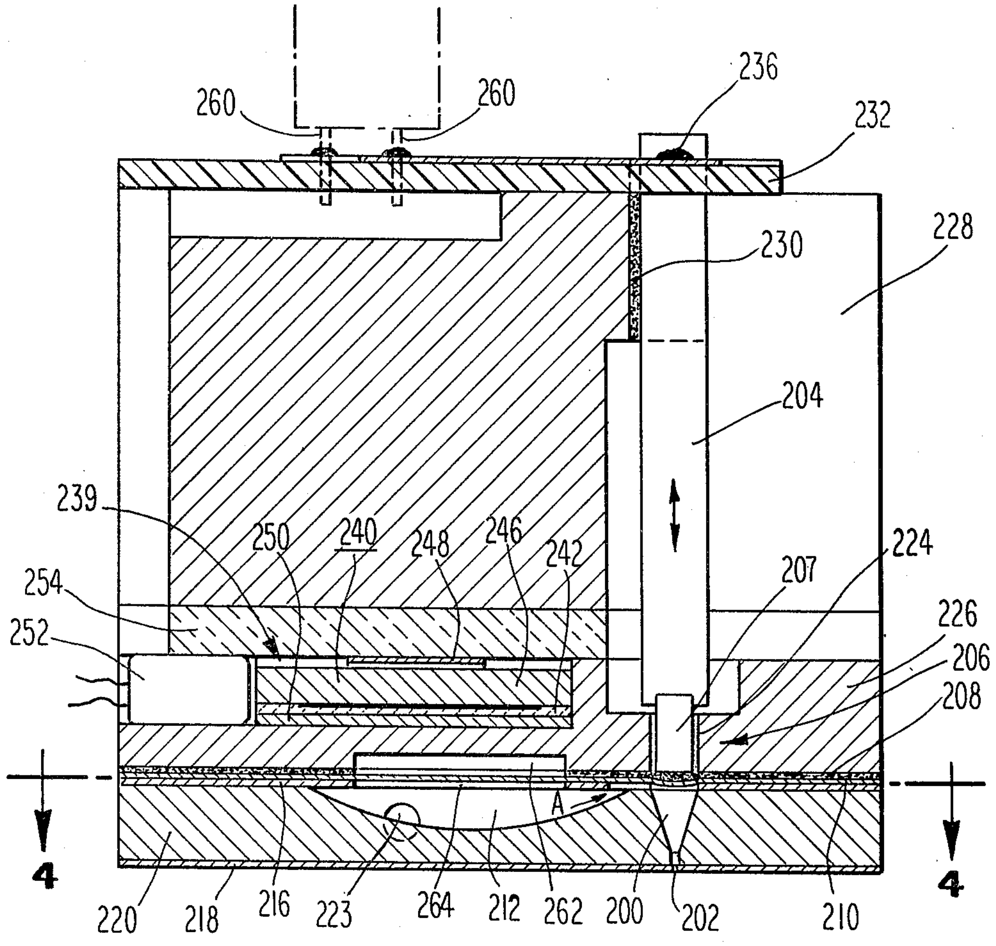
FIG. 1 is a sectional view of an ink jet apparatus constructed in accordance with the principles of this invention.
Figure 2:
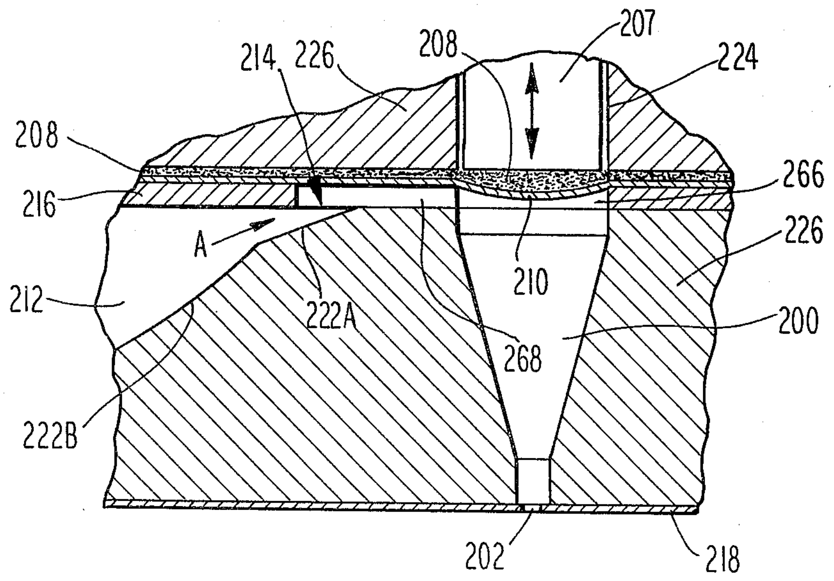
FIG. 2 is an exploded perspective view of the apparatus of FIG. 1.

Referring to FIGS. 1 and 2, an ink jet apparatus comprises a chamber 200 having an orifice 202 for ejecting droplets of ink in response to the state of energization of a transducer 204. The transducer 204 which is rectangular in cross-section transverse to the axis of elongation expands and contracts along the axis of elongation as depicted by the arrowhead shown in FIG. 1. The resulting movement of the transducer 204 along the axis of elongation is coupled into the chamber 200 by coupling means 206 including a foot 207, a viscoelastic material 208 juxtaposed to the foot 207 and a diaphragm 210 which is preloaded to a position best shown in FIG. 2 in accordance with the invention of copending application Ser. No. 336,601, filed Jan. 4, 1982, which is assigned to the assignee of this invention and incorporated herein by reference.

Ink flows into the chamber 200 from a reservoir 212 through a restricted inlet means provided by a restricted opening 214 best shown in FIG. 2. The inlet 214 comprises an opening in a restrictor plate 216.

In accordance with this invention, the reservoir 212 which is formed by a chamber plate 220 covered by the plate 216 tapers to an acute angle A along one side of the reservoir 212 leading to the inlet 214. The angle which preferably is less than 30° allows the surface tension and wetting properties of the ink to fully prime the jet thereby minimizing the possibility that bubbles will be formed. As shown in FIG. 2, the acute angle is formed by a surface 222A which connects with the concave surface 222B of the radius of curvature which is substantially larger than the overall or maximum depth of the reservoir as best shown in FIG. 1. A feed or input tube 223 shown in FIG. 1 and FIG. 3 supplies the reservoir 212 with ink at one end of the reservoir. A vent tube 225 communicates with the reservoir 212 at the opposite end.

Figure 3:
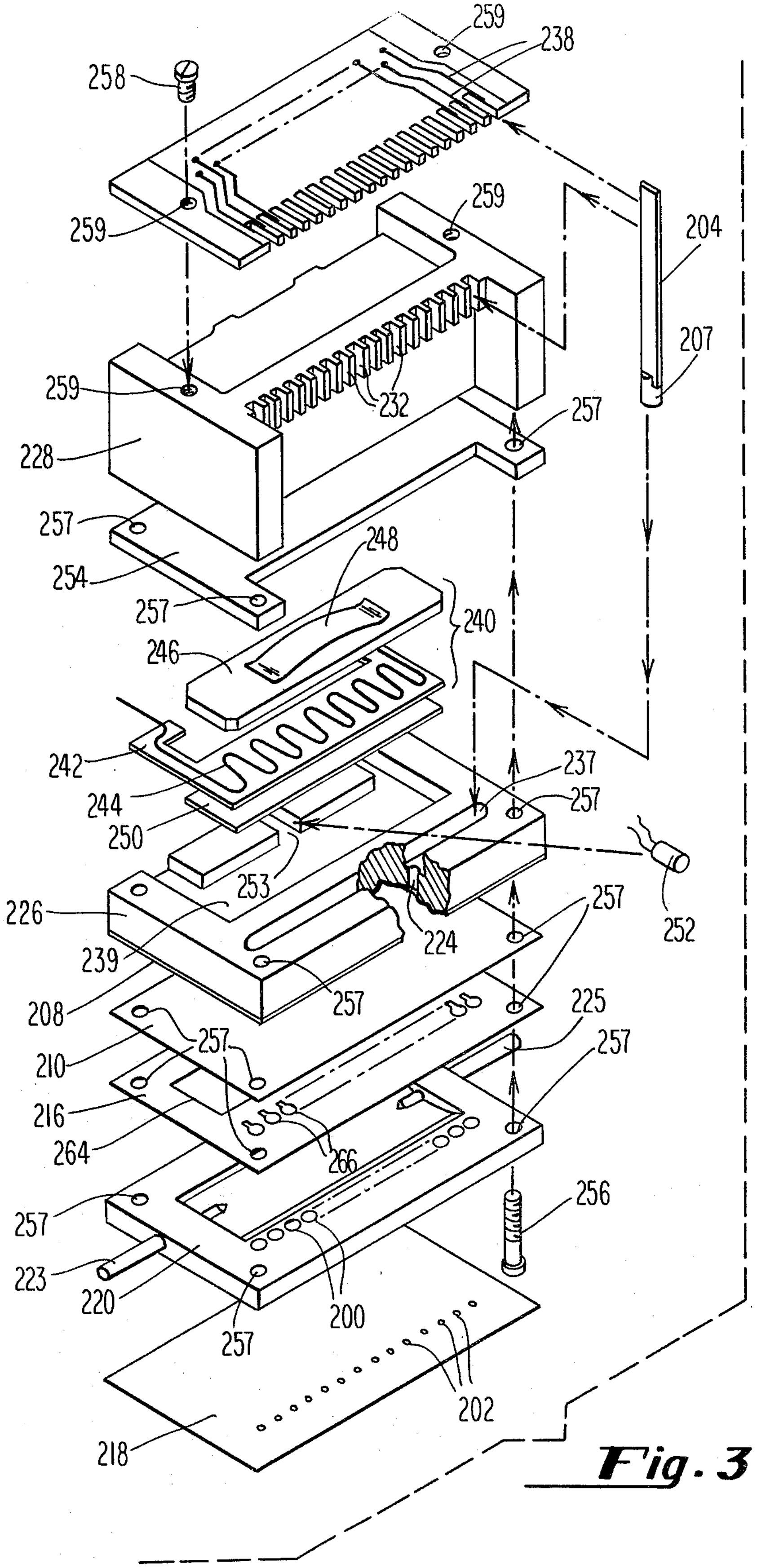
FIG. 3 is an enlarged sectional view of a portion of the apparatus shown in FIG. 1.

In accordance with the invention of copending application Ser. No. 336,600, filed Jan. 4, 1982 and Ser. No. 336,672, filed Jan. 4, 1982, assigned to the assignee of this invention and incorporated herein by reference, each of the transducers 204 as shown in FIGS. 1 and 3 are guided at the extremities thereof with intermediate portions of the transducers 204 being essentially unsupported as best shown in FIG. 1. One extremity of the transducers 204 is guided by the cooperation of the foot 207 with a hole 224 in a plate 226. As shown in FIGS. 1 and 2, the hold 224 in the plate 226 is slightly larger in diameter than the diameter of the foot 207. As a consequence, there need by very little contact between the foot 207 and the wall of the hole 224 with the bulk of the contact which locates the foot 207 and thus supports the transducer 204 coming with the viscoelastic 208 best shown in FIG. 2. The other extremity of the transducer 204 is compliantly mounted in a block 228 by means of a compliant or elastic material 230 such as silicone rubber in accordance with the invention of the aforesaid copending application Ser. No. 336,600 which is incorporated herein by reference. The compliant material 230 is located in slots 232 shown in FIG. 3 so as to provide support for the other extremity of the transducers 204. Electrical contact with the transducers 204 is also made in a compliant manner by means of a compliant printed circuit 234 shown in FIGS. 1 and 3 which is electrically coupled by suitable means such as solder 236 to the transducer 204. As shown in FIG. 2, the conductive patterns 238 are provided on the printed circuit 234.

As shown in FIGS. 1 and 3, the plate 226 including the holes 224 at the base of a slot 237 receiving the transducer 204 also includes a receptacle 239 for a heater sandwich 240 including a heater element 242 with coils 244, a hold down plate 246, a spring 248 associated with the plate 246 and a support plate 250 located immediately beneath the heater 240. In order to control the temperature of the heater 242, a thermistor 252 is provided which is received in a slot 253. The entire heater 240 is maintained within the receptacle in the plate 226 by a cover plate 254.

As shown in FIG. 3, the entire structure of the ink jet apparatus including the various plates or laminations are held together by means of bolts 256 which extend upwardly through openings 257 in the structure and bolts 258 which extend downwardly through holes 259 so as to hold the printed circuit board 234 in place on the plate 228. Not shown in FIG. 3 but depicted in dotted lines in FIG. 1 are connections 260 to the printed circuits 238 on the printed circuit board 234. The viscoelastic layer 208 adheres to the base of the plate 226 as depicted in FIG. 2.

Figure 6:
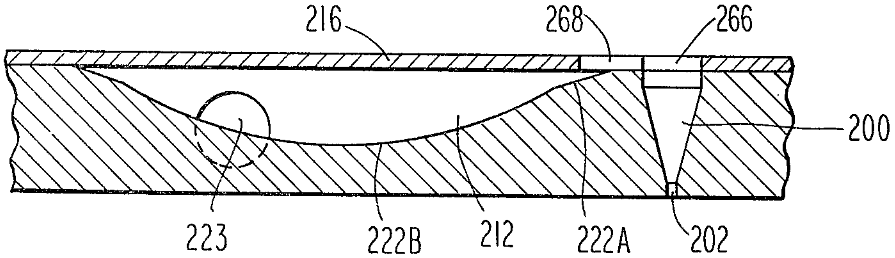
FIG. 6 is a sectional view taken along line 6—6 of FIG. 4.
Figure 7:
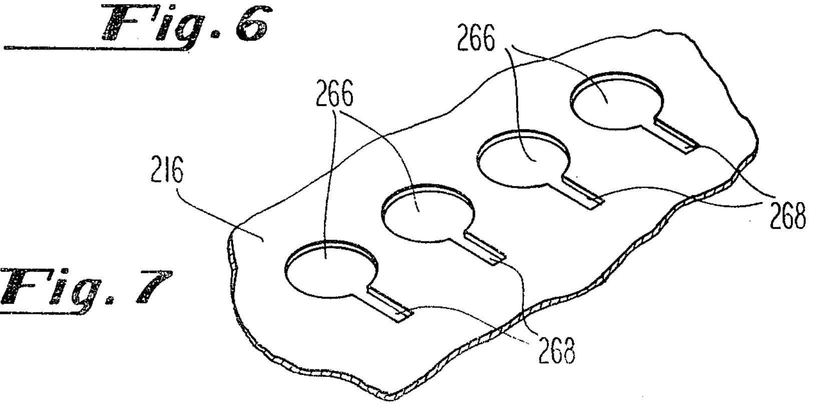
FIG. 7 is a perspective view of a portion of the restrictor plate best shown in FIGS. 2 and 3.

The reservoir 212 is at least partially compliant, and more specifically, includes a compliant wall portion. As shown in FIG. 1, the diaphragm 210 extends across the entire apparatus so as to cover the reservoir 212 and extend between the foot 207 and the chamber 200. Thus the diaphragm 210 is in direct communication with the reservoir 212 on one side and juxtaposed to an area of relief 262 on the opposite side of the diaphragm 210. This area of relief which extends along the length of the reservoir, i.e., from the first chamber 200 to the last chamber 200 in the chamber plate 220 as shown in FIG. 3, provides a compliant wall for the reservoir 212 which minimizes cross-talk between the various ink jet chambers. It will be observed that the restrictor plate 216 includes an opening 264 aligned with the area of relief 262 so as to provide direct communication between the diaphragm 210 and the reservoir thereby providing necessary compliance. As best shown in FIG. 7, the restrictor plate 216 includes another opening 266 having a radially extending slot 268 for each chamber in the array. The slot 268 provides the inlet 214 to the chamber 200 while the opening 266 permits direct communication between the diaphragm 210 and the chamber 200 which couples the movement of the transducer 204 as transmitted through the foot 207 into the chamber 200. The nature of the restrictor plate 216 and the function of the slot 268 may perhaps be better understood by reference to FIG. 6. It will also be noted that the restrictor plate 216 cooperates with the concave surface 222B and the linear surface 222A so as to form the acute, tapering of the chamber to the inlet 214 provided by the slot 268 in the restrictor plate 216.

Figure 4:
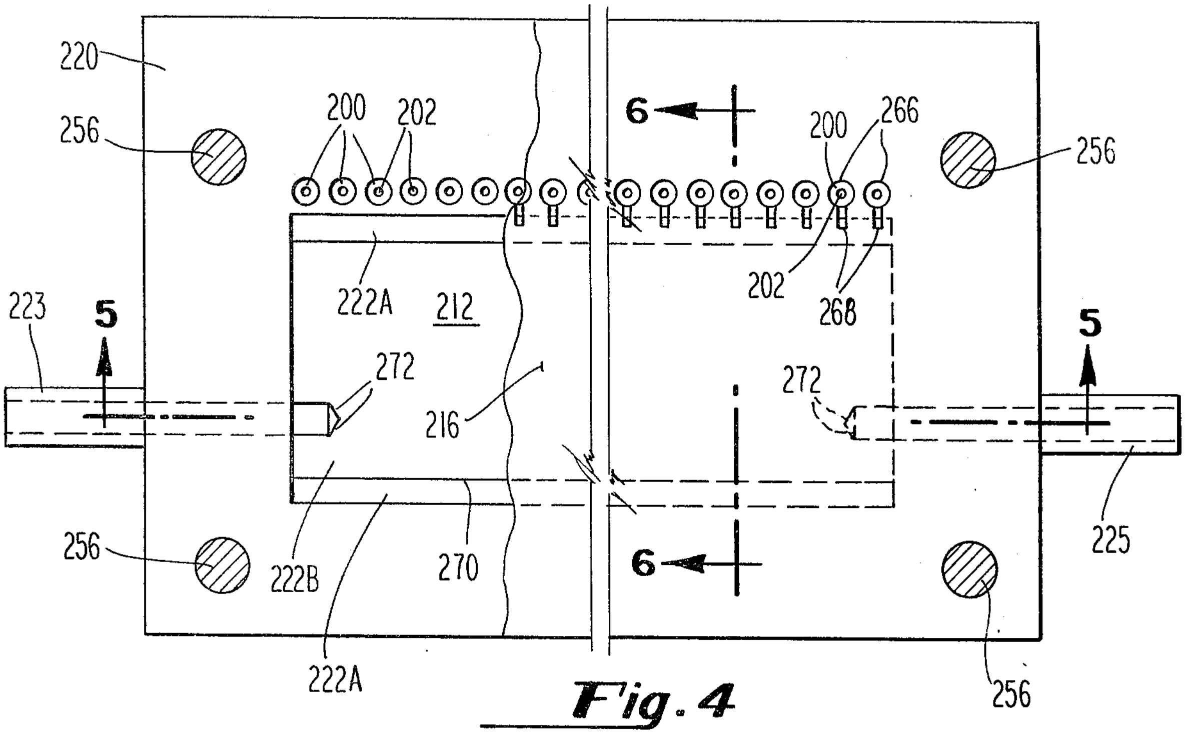
FIG. 4 is a plan view of the apparatus shown in FIG. 1 taken along line 4—4.
Figure 5:
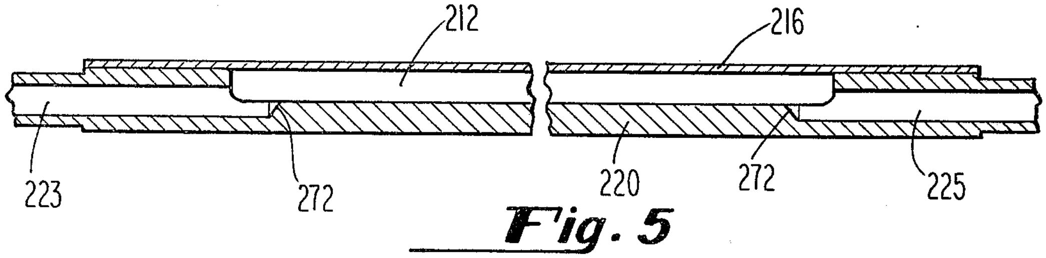
FIG. 5 is a sectional view taken along line 5—5 of FIG. 4.

Reference will now be made to FIGS. 4 and 5 for a further appreciation of the nature of the relationship of the reservoir 212 to the chambers 200 in the array, the inlet feed pipe 223 and the vent pipe 225. As shown in FIG. 4, the surface 222B does join with the surface 222A so as to form the line 270 shown in FIG. 4. The edge represented by the line 270 is perhaps best shown in FIG. 3. It is not so sharp as to substantially interfere with the effect of surface tension and wetting of the ink in the reservoir 212 as the ink proceeds during priming toward the inlet 214 as shown in FIG. 2. It will also be observed that the inlet feed pipe 223 and the vent pipe 225 includes tapered surfaces 272 which feed into and from the reservoir 212 so as to minimize the formation of the bubbles.

Figure 8:
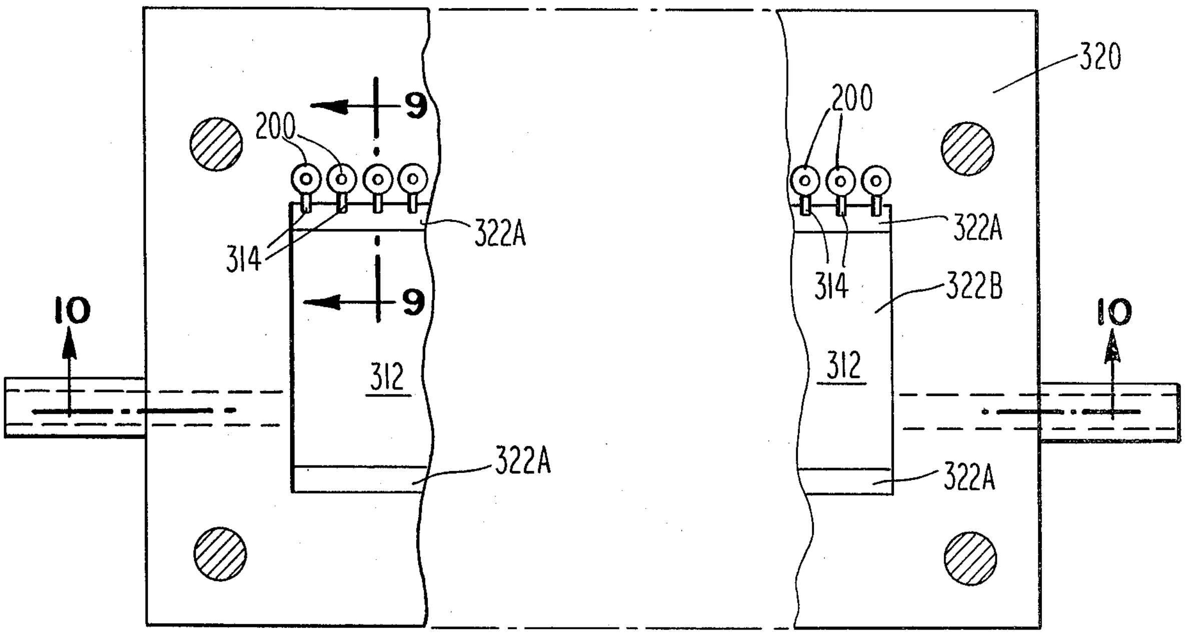
FIG. 8 is a plan view of a reservoir representing an alternative embodiment of the invention.
Figure 9:
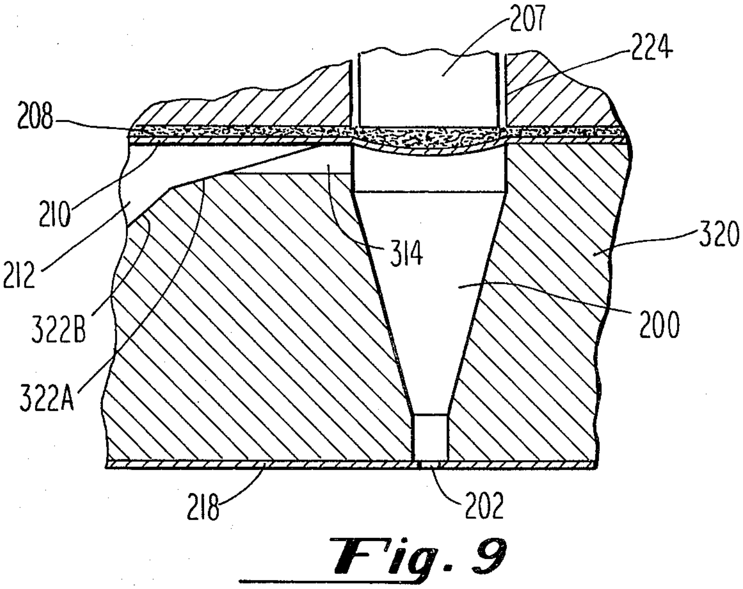
FIG. 9 is a sectional view taken along line 9—9 of FIG. 8.
Figure 10:
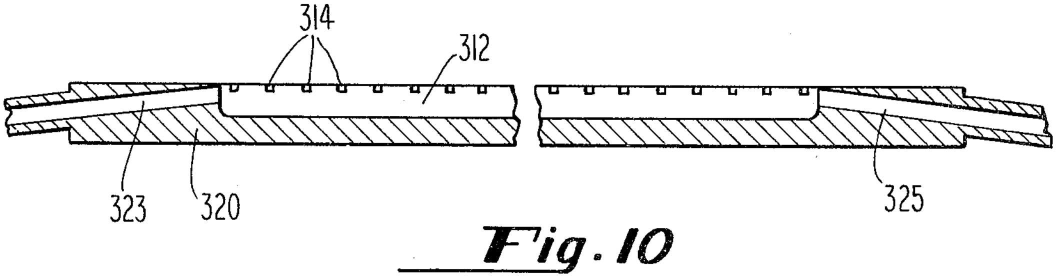
FIG. 10 is a sectional view taken along line 10—10 of FIG. 8.

In the embodiment described in FIGS. 1 through 7, a restrictor plate 216 having openings 266, slots 268 and an opening 264 so as to provide communication between the transducer 204 and the chamber 200, an inlet for ink and the necessary compliance for the reservoir 212. However, the restrictor plate may be eliminated by providing inlets 314 in a chamber plate 320 which are coupled directly into the reservoir 312 as shown in FIG. 8. Otherwise, the components of the ink jet apparatus are identical with those previously described except for the incline inlet feed tube 323 and the inclined vent tube 325. Of course, relief is necessary and the plate 226 as shown in FIG. 1 so that the diaphragm 210 as shown in FIG. 9 can deform to provide the required compliance for the reservoir 312. As shown in FIG. 9, the reservoir 312 tapers toward the inlets 314 due to the concave surface 322B and the inclined surface 322A.

In order to assure primability in accordance with this invention, the embodiments of the invention as described have shown the tapering of the reservoir into the inlets leading to the ink jet chambers. As utilized herein, the words tapering, acute angle, concave and surface are intended to describe a geometry whereby the reservoir is slowly reduced in cross-sectional area leading to the inlet to an ink jet chamber. In other words, there is no abrupt reduction in cross-sectional area as would be encountered if a wall is disposed transverse and at right angles to the base of a reservoir.

Although particular embodiments of the invention have been shown and described, other embodiments and modifications will occur to those of ordinary skill in the art which will fall within the true spirit and scope of the invention as set forth in the appended claims.

We claim:

1. An ink jet apparatus comprising:

at least one ink jet chamber including an ink droplet ejection orifice and an inlet; and a relatively shallow reservoir including wall portions at the outer extremities of the reservoir tapering to an acute angle, said inlet of said ink jet communicating with said reservoir in the region of said acute angle.

2. The ink jet apparatus of claim 1 wherein at least one of said walls is inwardly concave.

3. The ink jet apparatus of claim 1 wherein at least one of said walls is characterized by a radius of curvature substantially larger than the maximum depth of the reservoir.

4. The ink jet apparatus of claim 1 wherein the acute angle is less than 30°.

5. The ink jet apparatus of claim 1 further comprising a supply opening at one end of said reservoir.

6. The ink jet apparatus of claim 1 further comprising a supply opening and a vent opening at opposite ends of said reservoir.

7. An ink jet apparatus comprising:

a reservoir of relatively shallow depth including wall portions along one side of the reservoir tapering to an acute angle;

a plurality of ink jet chambers respectively including an ink jet droplet ejection orifice and an inlet located adjacent said one side of said reservoir; and a plurality of inlets located along said one side of said reservoir communicating with said reservoir and said ink jet chamber.

8. The ink jet apparatus of claim 7 comprising a plate including said reservoir, said inlets and said ink jet chambers.

9. The ink jet apparatus of claim 7 comprising a first plate including said ink jet chamber and said reservoir and a second plate including said inlets, said second plate abutting said first plate to close said ink jet chambers and said reservoir.

10. The ink jet apparatus of claim 7 further comprising a supply opening located at one end of said reservoir.

11. The ink jet apparatus of claim 7 further comprising a supply opening and a vent opening located at opposite ends of said reservoir.

12. The ink jet apparatus of claim 7 wherein the entire periphery of said reservoir is formed by a wall portion tapering to an acute angle.

13. The ink jet apparatus of claim 7 wherein at least one of said walls forming said reservoir is inwardly concave.

14. The ink jet apparatus of claim 7 wherein at least one of said walls is characterized by a radius of curvature at said one side of said reservoir substantially larger than the maximum depth of the reservoir.

15. The ink jet apparatus of claim 7 wherein the acute angle along said side is less than 30°.

16. An ink jet apparatus of claim 7 wherein the axis of each said ink jet droplet orifice extends in a direction parallel to the shallow depth of the reservoir.

* * * * *